(12) United States Patent
Hassibi

(10) Patent No.: US 7,105,146 B2
(45) Date of Patent: Sep. 12, 2006

(54) METHOD AND APPARATUS FOR HYDRATION OF CALCIUM OXIDE

(75) Inventor: Mohamad Hassibi, Perryopolis, PA (US)

(73) Assignee: Chemco Systems L.P., Monongahela, PA (US)

( * ) Notice: Subject to any disclaimer, the term of this patent is extended or adjusted under 35 U.S.C. 154(b) by 548 days.

(21) Appl. No.: 10/377,715

(22) Filed: Mar. 4, 2003

(65) Prior Publication Data

US 2004/0175324 A1 Sep. 9, 2004

(51) Int. Cl.
*B01J 8/00* (2006.01)
*C01F 11/02* (2006.01)

(52) U.S. Cl. ............. 423/640; 422/105; 422/110; 422/111; 422/162; 422/224; 422/232

(58) Field of Classification Search .......... 423/640; 422/105, 110, 111, 162, 224, 232
See application file for complete search history.

(56) References Cited

U.S. PATENT DOCUMENTS

| | | | |
|---|---|---|---|
| 3,839,551 A * | 10/1974 | Dozsa et al. | 423/640 |
| 4,261,953 A | 4/1981 | Gisler | |
| 4,329,090 A | 5/1982 | Teague et al. | |
| 4,382,911 A | 5/1983 | Pennell et al. | |
| 4,401,645 A | 8/1983 | Gisler | |
| 4,547,349 A | 10/1985 | Lane | |
| 4,580,902 A | 4/1986 | Dunstan | |
| 4,779,992 A | 10/1988 | Underwood | |
| 4,798,475 A | 1/1989 | Strandberg | |
| 4,824,032 A | 4/1989 | Johansson | |
| 4,877,598 A | 10/1989 | Von Jordan et al. | |
| 4,889,592 A | 12/1989 | Andersson et al. | |
| 5,332,436 A | 7/1994 | Walker, Jr. et al. | |
| 5,512,265 A * | 4/1996 | Funahashi et al. | 423/640 |
| 5,746,983 A | 5/1998 | Stephansen | |
| 5,876,689 A * | 3/1999 | Webeling et al. | 423/640 |
| 5,965,103 A | 10/1999 | Golley et al. | |
| 6,254,267 B1 | 7/2001 | Arnaud | |
| 6,357,905 B1 | 3/2002 | Birchard | |
| 6,412,974 B1 | 7/2002 | Scholl et al. | |

* cited by examiner

*Primary Examiner*—Edward M. Johnson
*Assistant Examiner*—Timothy C. Vanoy
(74) *Attorney, Agent, or Firm*—Kenyon & Kenyon LLP

(57) ABSTRACT

An improved system for slaking of lime which does not rely on the weighing of materials delivered to the vessel where the mixing takes place. A control system is utilized to control the volume of lime and water delivered to insure that a preselected temperature is obtained during the chemical reaction in the vessel. In a batch process the volume of lime and water is controlled based on the temperature sensed to maintain the temperature at the desired level. Once the reaction is complete the resultant slurry is discharged from the vessel for further processing. The vessel is then cleansed and prepared for the next batch.

25 Claims, 1 Drawing Sheet

METHOD AND APPARATUS FOR HYDRATION OF CALCIUM OXIDE

TECHNICAL FIELD

The present invention relates primarily to a method and apparatus for mixing dry powdered material such as lime with a liquid such as water to form a slurry in a manner which permits hydration of the calcium oxide in a batch system. In accordance with the invention, described in more detail below, a vessel is provided with a mixing apparatus to insure thorough mixing of the constituents. The temperature of the mixture is controlled to achieve an optimum chemical hydration and fine particles, so that the mixture can be efficiently used for water treatment, waste water treatment, industrial processes and air pollution abatement.

DESCRIPTION OF RELATED ART

The hydration of calcium oxide is often referred to and is specifically referred to herein as lime slaking. Lime slaking involves the process of mixing calcium oxide with water to produce calcium hydroxide (Ca(OH)2) or hydrated lime. Hydrated lime can be used for a number of purposes, including water treatment, waste water treatment and air pollution abatement of certain types. As the slaking process is exothermic, there is a release of a considerable amount of energy in the form of heat. The quality of the hydrated lime produced and its particle size is affected greatly by the temperature at which chemical reaction takes place.

One type of existing art for hydration of calcium oxide is called "dry hydration". This is a continuous process in which calcium oxide and steam, or fine water spray, are added to the hydration vessel. The end result is calcium hydroxide powder commercially referred to as "hydrated lime". Hydrated lime, when mixed with water, will produce a lime slurry similar to the one produced by a slaking process, described below.

Another approach for hydration of calcium oxide includes a slaking process wherein predetermined amounts of calcium oxide are hydrated in "batches." In such a batch slaking process, pulverized quick lime and water are delivered in controlled discrete intervals in measured quantities from a lime silo and from a standard water source, respectively, into a slaker vessel for hydration. The slurry formed is subsequently transferred into a distribution tank. In such known processes, the required amount of water, having been previously weighed, is introduced into the slaker vessel, after which the required amount of lime, having been previously weighed, is injected into the slaker vessel from the lime silo, typically through the use of a conveyor. The slaking temperature is stabilized at between 75° and 80° C.; however, significant temperature variation above or below this range can occur. If the temperature exceeds 90° C., water is added until the temperature decreases to a desired level. If the temperature in the slaker vessel did not reach 75° C. during the slaking period, the amount of water is reduced in subsequent slaking processes. An example of this system is described in U.S. Pat. No. 5,746,983, issued May 5, 1998 to Pojuar Stephenson.

When slaking temperature is allowed to vary too greatly, as for example in the above-described process, the slurry produced may be of inconsistent quality. The operating range for temperature in the known slaking process is 167 to 194° F., that is, an 27° F. range. This wide variation of temperature from one batch to another will result in poor quality hydrate. By contrast, a system and method according to embodiments of the invention operates in a much narrower temperature range, i.e., ± (plus or minus) 3° F., and therefore the quality of hydrated lime obtained is enhanced compared to that available under the prior art. According to the embodiments, a desirable consistency of the lime slurry is maintained, and subsequent batches may be made without the need for supplemental lime or water.

DETAILED DESCRIPTION OF THE EMBODIMENT

Figure 1:
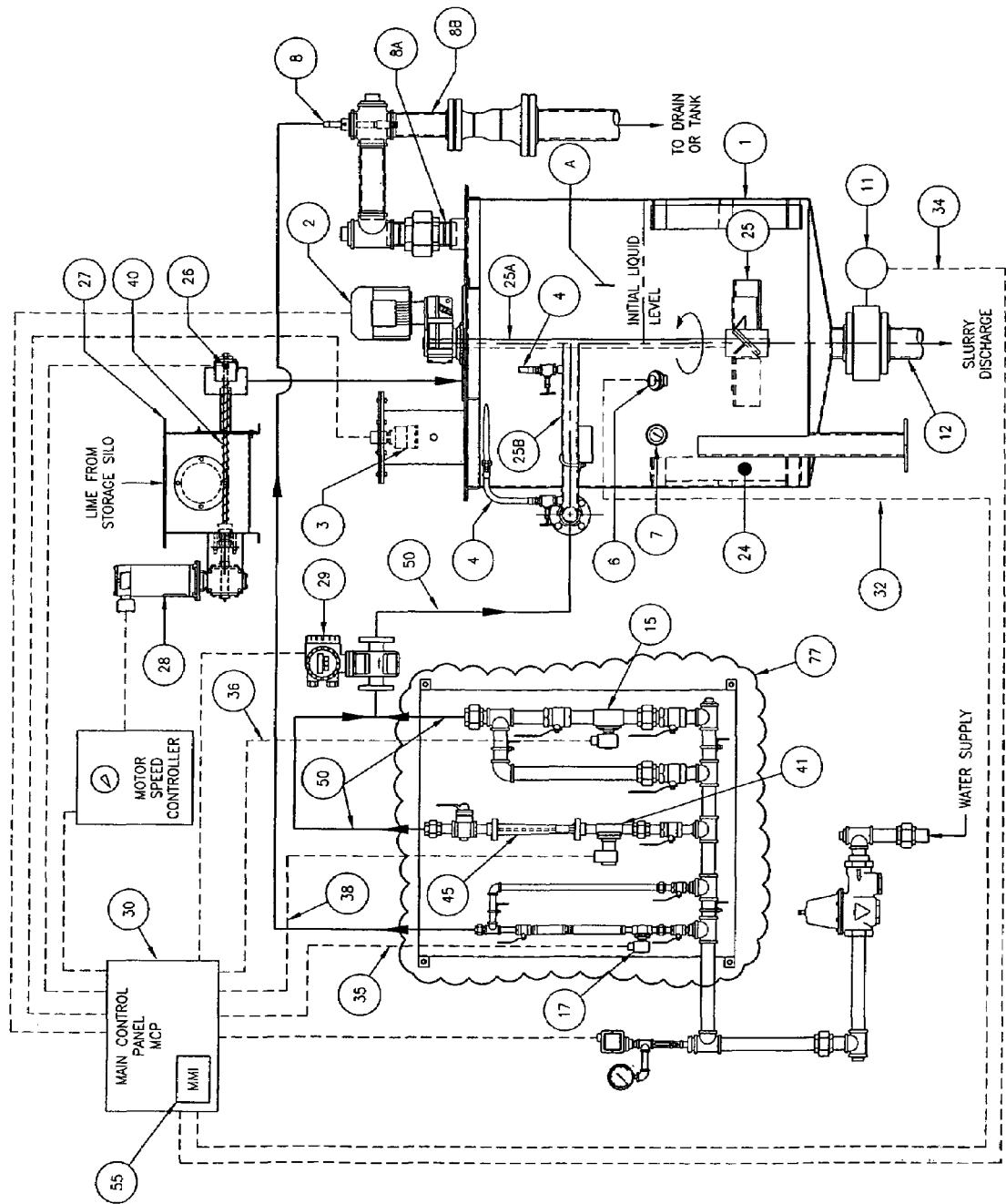
FIG. 1 is a schematic of the apparatus according to embodiments of the present invention, for preparing a lime slurry in a batch slaker.

As shown in FIG. 1, a system according to embodiments of the invention includes a slaker vessel or tank 1 for receiving lime and water from various sources as will be described below. The tank 1 is generally cylindrical in configuration with a conical bottom for discharging the contents thereof through a discharge pipe 12. Located generally in the center of tank 1 is a rotating shaft 25A to which are mounted turbine impellers or paddles 25 located in a lower portion of the tank to facilitate mixing the contents therein. A motor or agitator 2 for rotating the shaft, and ultimately the turbine impellers 25, is mounted to the tank 1. Any type of motor will suffice for this purpose so long as it can generate sufficient power to rotate the impellers 25 through a slurry material, particularly of lime and water. A plurality of nozzles 4 extend into a top portion of the tank 1, and are arranged for delivering water for both cleaning the tank 1 and filling it with water in a batch operation process. A water supply header 25B under pressure is connected to nozzles 4 through a flow measuring device 29. The flow measuring device 29 is connected to a slaking or hydrating water supply 50 through a water conduit which may be formed as a system of pipes 77. The flow measuring device measures a volume of water supplied by the water supply 50 and delivered to the tank 1. Any flow measuring device capable of measuring an amount of water fed by volume or weight may be used for this purpose.

A lime feeder 27 is arranged within the system for delivering lime into the top portion of the tank, ultimately for mixing with the water which is delivered into the tank 1 from water supply 50. A feed screw 40 of the lime delivery system is connected to a variable speed feeder drive 28. The variable speed drive 28 is configured to rotate the screw 40 at a desired speed to deliver a desired quantity of lime to the tank 1. Any type of motor can be used for this purpose so long as it generates sufficient power to rotate the screw 40 and transmit the desired volume of lime.

A measuring device 26 is electrically connected to a Main Control Panel (MCP) 30 (hereinafter, "controller" 30). The controller 30 can be any type of computer capable of sensing various conditions in the system and of imparting a signal depending on the conditions sensed. The controller 30, depending on a preset volume of lime that is required for dispensing into the tank 1, is configured to operate the lime feeder 27 until that preset volume has been dispensed, at which time the controller 30 will switch feeder drive 28 into the off position so that lime delivery will cease. According to embodiments of the invention, the measuring device 26 is a pulse switch. However, different flow, volume or weight measuring devices can be used for the function performed by measuring device 26.

A temperature sensor 6 is located on an internal portion of the tank 1 for sensing the temperature of the mixture of lime and water once it has been dispensed into the tank. For this purpose, sensor 6 could be a Pt-100 element, but any temperature sensor for the temperature range involved will suffice. Sensor 6 is electrically connected via electrical line 32 to the controller 30 to provide the sensed temperature thereto, so that the controller 30 can control the delivery of water depending on the temperature sensed. A temperature indicator 7 is located on the tank so that the temperature can be visually read as well as sensed by the controller 30. Baffles 24 are located in the lower portion of the tank to enhance mixing during rotation of the turbine impellers 25.

A dust and vapor removal system is arranged for removing undesirable materials, typically dust and vapor created during the mixing process, from a space above the slurry, known as "head" space, in the tank 1. Included in this removal system is a full cone water spray system 8 located in a pipe 8b for drawing a vacuum on a pipe 8a in communication with the top portion of the tank 1. The full cone spray generated in pipe 8b, which in embodiments may be a 4-inch pipe, creates a negative pressure in pipe 8a. This enables steam to be drawn out of the tank 1, condensed to water and discharged through pipe 8b to drain, or to be delivered into some other tank. Unwanted dust may also be drawn out of tank 1 by the negative pressure. The flow of water to the full cone water spray system 8 is controlled by the controller 30 and a valve 17. According to embodiments, the valve 17 is a solenoid valve. When the valve 17 is open, water is permitted to flow to the full cone water spray system 8, and when the valve 17 is closed, water is not permitted flow to the full cone water spray system 8. Line 35 electrically connects the controller 30 with the valve 17. Via a signal to the valve 17 on line 35, the controller 30 automatically opens the valve 17 upon sensing conditions calling for the delivery of a pre-selected amount of lime to the tank 1. It is noted that while the above-described embodiment utilizes a cone spray in a tube to create negative pressure in the tank 1, any draft inducing device may be used for this purpose.

As described earlier, a slaking water supply 50 is connected through a pipe system 77 to a flow measuring device 29 for measuring the volume of water being delivered to the water header 25B and water spray nozzles 4. The controller 30 controls the flow of water through the flow measuring device 29, and ultimately to tank 1, by opening and closing a water valve 15. The controller 30 opens and closes the water valve 15 by sending a suitable signal via an electrical line 36, which is connected to the water valve 15. The valve 15 is opened and closed to adjust the amount of water being delivered to the tank 1, at the end of each batch, responsive to a temperature sensed by temperature sensor 6 and in accordance with predetermined limits on allowable temperature variation, as discussed in more detail below. According to embodiments, the valve 15 may be a solenoid valve; however, any liquid flow control device such as a control valve can also be used.

In operation the controller 30 is initially set to control a number of parameters of the system including the volume of lime to be delivered from the storage silo through the feeder 27 and the volume of water delivered from the water supply 50 through nozzles 4. Values for the volume of lime and volume of water to be delivered are pre-selected based on a desired process temperature and lime-to-water ratio for a given batch hydration process. According to embodiments of the present invention, the desired process temperature is approximately 180° F. plus or minus 3° F. The controller operates the system to maintain that temperature during the mixing process.

According to embodiments, the pre-selected volume of water for each batch is delivered to the tank 1 after lime slurry produced by the previous batch process is discharged from the tank 1 through the discharge pipe 12. The controller 30 opens and closes a valve 11 via a signal on an electrical line 34 to control discharge of the tank 1. According to embodiments, valve 11 may be a knife gate valve with either pneumatic or electric actuator. The pre-selected volume of water initially introduced following discharge of the slurry will be applied as cleansing spray to cleanse the sidewalls of the tank 1. To deliver the pre-selected volume of water following tank discharge, the controller 30 opens valve 15 to permit water from the water supply 50 to flow through the pipe system 77 and through flow measuring device 29 to nozzles 4 for delivery to the tank 1, for mixing with lime subsequently delivered through the feed system discussed above. Once the full amount of the pre-selected volume of water has been delivered to the tank 1, the flow measuring device 29 sends a signal to the controller 30, which, in response, closes down the valve 15 to stop the delivery of water to the tank 1.

Subsequently, to deliver the pre-selected volume of lime to the tank 1, the controller 30 is activated to operate the feeder drive 28, which, in turn, operates the feed screw 40 as described earlier, to deliver the pre-selected volume of lime through the lime volume measuring device 26 into the tank 1. The lime is delivered through the top of the tank until the full amount of the pre-selected volume has been delivered, at which time a signal is received from lime volume measuring device 26 by the controller 30. In response, the controller 30 shuts down the feeder drive 28. While embodiments of the invention may use a screw feeder, as described, to feed lime to the tank 1, any type of feeding device may be used for this function.

Shortly before delivery of the lime into the tank 1, agitator motor 2 is activated to rotate turbine impellers 25 to insure substantial mixing of the water and lime. The baffles 24 extend sufficiently from the sidewalls of tank 1 to enhance the mixing process. Since the mixing of water with lime produces hydrated lime, an exothermic reaction is produced within tank 1. According to embodiments of the present invention, the desired process temperature is set at approximately 180° F. The actual process temperature is continually measured by the temperature sensor 6 and transmitted to the controller 30 via electrical line 32. If the measured temperature is raised above the desired process temperature of 180° F. to a preset value of 190° F., the controller 30 automatically opens cooling water valve 41, via a signal on electrical line 38, to admit cooling water in a sufficient volume into the tank 1, to thereby reduce the process temperature to the desired process temperature. The cooling water flow rate can be visually observed via a flow measuring device 45. The amount of water delivered for cooling is measured by flow measuring device 29. Once the desired process temperature is sensed by temperature sensor 6, a signal is conveyed to the controller 30, which, in response, closes the cooling water valve 41 and consequently stops delivery of cooling water to the tank 1. According to embodiments, the cooling water valve 41 is a solenoid valve, but any type of automatic valve can be used for this function.

Similarly, if the process temperature is too low, the lime feeder drive 28 is actuated by the controller 30 to operate the feed screw 40 to deliver a volume of lime from the storage silo through measuring device 26 to tank 1. The volume delivered is measured by measuring device 26. The delivery of additional lime causes the process temperature to increase, and delivery is continued until the temperature is raised sufficiently to approach the desired process temperature. Once the desired process temperature is sensed by temperature sensor 6, a signal is conveyed to the controller 30, which stops the operation of the feeder drive 28 and consequently delivery of lime to the tank 1. Once the temperature has been re-established to be between ±3° F. of the desired process temperature, any further delivery of water and lime is stopped. As a result of the exothermic reaction produced by the mixing of lime and water in the tank 1, the evaporation of water is effected in the form of steam. As mentioned earlier, to prevent the steam from rising into the lime feeder 27, steam is removed continuously from the reactive vessel by a removal system including a full cone water spray system 8 located in a pipe 8b.

At the completion of one slaking batch when the reaction is sufficiently completed and the desired temperature is maintained, the controller 30 stops agitator motor 28 and automatic drain valve 11 is then opened, allowing the slurry to be transferred and discharged via pipe 12 for delivery for further processing.

Once the tank 1 is empty, valve 11 closes, solenoid valve 15 opens and water is sprayed inside the tank via nozzles 4, cleaning the inside of the tank 1 and again filling the tank 1 with the pre-selected volume of water for the next batch process. After the desired volume is reached, valve 15 closes and the unit is ready for a next batch start command from the controller 30.

Because the respective volumes of cooling water and/or additional lime that were introduced into a given batch process in order to maintain process temperature within the desired range are measured and known, these volumes can be used to form a corrected value for volume ratio of water to lime in a subsequent batch. That is, the volumes of slaking water and lime initially delivered in a given batch can be adjusted to form a volume ratio of lime to water that reflects, from the outset, the corrective volumes that were added during the previous batch. More specifically, the volume of water initially delivered in a given batch may be increased by the corrective amount that was added during the previous batch. Similarly, the volume of lime initially delivered in a given batch may be increased by the corrective amount that was added during the previous batch. In this way, the need for additional corrective volumes as the process is ongoing may be reduced or eliminated.

The size of a batch can be varied by setting the desired batch volume by the operator on a Man Machine (MMI) interface touch screen 55 of the controller 30. So long as the ratio between the lime and the water is maintained consistent with the previous batch, there is much less likelihood that the reaction will take place at a temperature that is unacceptably low or high. The temperature of the batch in subsequent batch processes should remain within ± three degrees Fahrenheit of the desired process temperature. If for any reason, the process temperature exceeds a desired process temperature as selected on the controller 30, and the condition persists for a predesignated period of time, the controller 30 will automatically shut down feeder 27 and add cold water via valve 41 and send an alarm to the operator. If the addition of cold water drops the process temperature to below the desired process temperature, the feeder 27 can become activated again.

A power monitor on tank agitator motor 2 monitors the power draw on this motor. Excessive water or low lime feed will result in a thin slurry and a low power alarm. Low water feed or high lime feed will result in a thick slurry and a high power alarm. When the high power alarm is activated the controller 30 will stop the lime feed and add water through valve 41 to reduce slurry thickness.

If there is a failure of the system to control properly the feed of water, for example, too much or too little water is added in a pre-set time interval, a level device 3 associated with tank 1 will activate an alarm and, after a time delay, shut the system down and alert the operator. According to embodiments, the level device 3 may be an ultrasonic, non-contact device. Similarly, in connection with the lime feed, if there is insufficient slaking water due to failure of valve 15 or too much lime due to failure of measuring device 26, the slurry temperature will exceed the desired process temperature and the controller 30 will open valve 41, through electric line 38, and add cooling water to bring the temperature down to the desired process temperature. The visual flow meter 45 will provide a visual confirmation of flow to the system. At the same time, the controller 30 will stop feeder 27. If this condition persists for a preset time period an alarm will sound and the operator is notified. Whether by notification of the operator or simply by viewing the local temperature indicator 7, bypass valve 22 can be manually activated to avoid the potential of explosion due to instantaneous steam release.

The above has been a description of the preferred embodiment of the invention and it should be understood that other systems or subsystems for accomplishing the invention can be employed consistent with the claims hereafter and interpretation of the full scope of the invention should not be unduly limited by the description of the preferred embodiment or embodiments discussed above.

What is claimed is:

1. A process for hydrating lime in batches, comprising:
   a. measuring a first volume of lime for delivery to a vessel;
   b. delivering said first volume of lime to said vessel;
   c. measuring a first volume of water for delivery to said vessel;
   d. delivering said first volume of water to said vessel;
   e. mixing said first volumes of lime and water in said vessel to form a slurry;
   f. pre-selecting a desired process temperature to be maintained in said vessel;
   g. measuring a process temperature in said vessel;
   h. controlling said process temperature by determining whether to add a second volume of at least one of water and lime to achieve said desired process temperature;
   i. measuring said second volume of at least one of water and lime;
   j. adding said second volume of at least one of water and lime to said slurry;
   k. forming a corrected value based on said first and second volumes; and
   l. in a subsequent batch process, delivering a volume ratio of lime to water to said vessel based on said corrected value.

2. The process according to claim 1, wherein said controlling includes controlling said process temperature over a range of degrees Fahrenheit of said desired process temperature.

3. The process according to claim 2, wherein said temperature range is between 177 degrees Fahrenheit and 190 degrees Fahrenheit.

4. The process according to claim 1, further comprising: after step of forming a corrected value, discharging said slurry from said vessel, and cleansing said vessel.

5. The process according to claim 4, wherein said slurry discharged from the vessel is delivered to a storage vessel.

6. The process according to claim 4, further comprising: after said cleansing step, delivering lime to said vessel.

7. The process according to claim 4, wherein said cleansing step includes adding water for said subsequent batch process.

8. The process according to claim 1, wherein said volume of water and lime delivered in said subsequent batch process is substantially equal to said first volumes of water and lime plus said second volumes of water and lime.

9. The process according to claim 1, further comprising removing steam from said vessel during said mixing of said lime and water.

10. The process according to claim 9, wherein said removing step includes creating vacuum pressure in said vessel.

11. The process according to claim 1, wherein said desired process temperature is approximately 180 degrees Fahrenheit.

12. The process according to claim 1, wherein said controlling step is determining to add a second volume of lime to raise the process temperature to achieve said desired process temperature.

13. The process according to claim 1, wherein said step of adding said second volume is adding a second volume of lime to raise the process temperature to achieve said desired process temperature.

14. A process for hydrating lime in batches, comprising:
 a. measuring a first volume of lime for delivery to a slaker vessel;
 b. delivering said first volume of lime to said vessel;
 c. measuring a first volume of water for delivery to said vessel;
 d. delivering said first volume of water to said vessel;
 e. mixing said first volumes of lime and water in said vessel;
 f. pre-selecting a desired process temperature to be maintained in said vessel;
 g. measuring a process temperature in said vessel;
 h. measuring a second volume of either water or lime;
 i. controlling said process temperature by adding said second volume of either water or lime to achieve said desired process temperature, wherein said controlling includes controlling said process temperature over a range of degrees Fahrenheit of said desired process temperature, wherein said temperature range is between ±3 degrees from said desired process temperature;
 j. forming a corrected value based on said first and second volumes; and
 k. in a subsequent batch process, delivering a volume ratio of lime to water to said vessel based on said corrected value.

15. An apparatus for hydrating quick lime in a batch process comprising:
 a. a vessel for receiving lime and water for mixing, said vessel having sidewalls and a bottom portion for retaining said lime and water;
 b. a lime feeder for delivering lime to said vessel;
 c. a water conduit for delivering water to said vessel;
 d. a controller for controlling a temperature of a mixture of said lime and water to maintain said temperature at between about ±3° F. of a desired process temperature;
 e. a temperature sensor for sensing said temperature and providing it to said controller, said controller and said temperature sensor cooperating to control delivery of lime and water to said vessel; and
 i. a discharge valve associated with said vessel;
 wherein said controller cooperates with said lime feeder and said water conduit to deliver a volume ratio of lime to water to maintain said temperature of said mixture in a subsequent batch of lime and water consistent with a volume of water and lime delivered in a prior batch process to maintain said desired process temperature.

16. The apparatus according to claim 15, wherein said discharge valve is connected to said bottom portion of said vessel.

17. The apparatus according to claim 15, further comprising at least one of a pneumatically and electrically operated actuator connected to said controller and said discharge valve to discharge the mixture from the vessel.

18. The apparatus according to claim 15, further comprising a dust and vapor remover for removing dust and vapor from said vessel during an exothermic chemical reaction that occurs from mixing lime and water in said vessel.

19. The apparatus according to claim 15, wherein said lime feeder includes a variable speed drive connected to said controller for controlling the delivery of lime to said vessel.

20. The apparatus according to claim 15, further comprising an agitator in said vessel for mixing said lime and water.

21. The apparatus according to claim 15, further comprising nozzles for delivering water to said vessel.

22. The apparatus according to claim 15, further comprising a level detector to monitor a level of slurry in said vessel, said detector being connected to said controller to provide an alarm if a preset slurry level is not maintained.

23. The apparatus according to claim 22, wherein said level detector includes an ultrasonic non-contact device for measuring said level in said vessel.

24. The apparatus according to claim 15, wherein said bottom portion of said vessel is conical in configuration with said discharge valve being located below said conical portion.

25. A process for hydrating lime in batches, comprising:
 a. providing a vessel for receiving a first volume of lime and a first volume of water;
 b. measuring said first volume of lime for delivery to said vessel;
 c. delivering said first volume of lime to said vessel;
 d. measuring said first volume of water for delivery to said vessel;
 e. delivering said first volume of water to said vessel;
 f. mixing said first volumes of lime and water in said vessel;
 g. pre-selecting a desired process temperature to be maintained in said vessel;
 h. measuring an actual process temperature in said vessel; and
 i. raising said actual process temperature to said desired process temperature by adding a second volume of lime.

* * * * *